United States Patent [19]

Nakayama et al.

[11] Patent Number: 4,575,475
[45] Date of Patent: Mar. 11, 1986

[54] MAGNETIC RECORDING MEDIUM

[75] Inventors: Masatoshi Nakayama; Haruyuki Morita, both of Saku; Yuichi Kubota, Komoro; Keiko Tsuchiya, Saku, all of Japan

[73] Assignee: TDK Corporation, Tokyo, Japan

[21] Appl. No.: 629,465

[22] Filed: Jul. 10, 1984

[30] Foreign Application Priority Data

Jul. 12, 1983 [JP] Japan .................................. 58-125596
May 26, 1984 [JP] Japan .................................. 59-107178

[51] Int. Cl.$^4$ .............................................. G11B 5/70
[52] U.S. Cl. ...................................... 428/480; 360/134; 360/135; 360/136; 427/40; 427/129; 427/128; 427/131; 427/132; 428/694; 428/900
[58] Field of Search ................ 427/132, 40, 129, 131, 427/128; 156/272.6; 428/694, 900, 695, 480; 204/192 M; 360/134-136; 252/62.54

[56] References Cited

U.S. PATENT DOCUMENTS

| 3,639,134 | 2/1972 | Stegmeiier | 427/40 |
| 3,898,952 | 8/1975 | Shirahata | 427/40 |
| 4,220,117 | 9/1980 | Shinohara | 427/132 |
| 4,250,225 | 2/1981 | Shirahata | 427/40 |
| 4,260,466 | 4/1981 | Shirahata | 427/35 |
| 4,323,629 | 4/1982 | Kunieda | 428/457 |
| 4,337,279 | 6/1982 | Bolak | 427/40 |
| 4,418,126 | 11/1983 | Izumi | 428/492 |
| 4,429,024 | 1/1984 | Meno | 427/41 |
| 4,450,186 | 5/1984 | Shinohara | 428/900 |
| 4,472,467 | 9/1984 | Tamaki | 427/40 |

Primary Examiner—Ellis P. Robinson
Attorney, Agent, or Firm—Oblon, Fisher, Spivak, McClelland & Maier

[57] ABSTRACT

In a magnetic recording medium comprising a plastic base film and a magnetic layer formed thereon, the base film is plasma treated at frequencies in the range of 10 kHz to 200 kHz in an inorganic gas such as argon and nitrogen and preferably, in an inorganic gas containing at least 5% of oxygen.

11 Claims, 6 Drawing Figures

MAGNETIC RECORDING MEDIUM

BACKGROUND OF THE INVENTION

This invention relates to magnetic recording media, and more particularly, to megnetic recording media having a base film plasma treated for improved durability.

Several decades have passed since the appearance of magnetic recording media comprising a nonmagnetic substrate and a magnetic layer formed from a magnetic powder of oxide type such as gamma-$Fe_2O_3$, gamma-$Fe_3O_4$ and cobalt-impregnated gamma-$Fe_2O_3$ and a binder. Recently, for the purpose of further improving recording density, magnetic recording media comprising a magnetic layer formed from a ferromagnetic powder such as Fe, Co, Ni, Fe—Co, Co—Ni, Fe—Co—Ni, Fe—Co—B, Fe—Co—Cr—B, Mn—Bi, Mn—Al, Fe—Co—V, etc. and a binder, and magnetic recording media having a magnetic layer in the form of a vacuum deposited metal film or sputtered metal film were developed and is now of great interest in the art.

These magnetic recording media, particularly for use as magnetic tape and magnetic discs, must fulfil a number of requirements including low dynamic coefficient of friction, smooth and stable travel performance for a prolonged period, improved wear resistance, stability under storage environment to ensure constant reproduction, and durability (durability of tape both during normal operation and in the still mode).

A variety of pre-treatments have heretofore been made on various base films for the purpose of improving durability. Such pre-treatments include treatments with chemical solution, coating, corona discharge treatment, and the like.

Chemical treatments may be treatments with acid and alkali. Among such chemical treatments most effective is by oxidizing the surface of a base film with a chemical solution of a strong acid and/or a strong oxidizing agent, for example, chromate solution, and introducing carbonyl or carboxyl radicals to etch the surface. The chemical treatments, however, require subsequent rinsing and drying of film surface and a great investment is needed for the treatment of spent liquid. Particularly, chromate treatment yields a spent liquid which must be severely treated for environmental pollution control, and its commercial utilization is now diminishing.

The film coating technique is by coating a base film with an undercoat on which a magnetic film is formed. The interaction between a binder in the undercoat and the magnetic film is necessary. The composition of the undercoat must be selected to meet a particular binder and pigment used in the magnetic layer. The coating techniques reguire not only such a careful choice, but also coating and drying steps. Of course, the consumption of coating material leads to the increased cost of products.

The corona discharge treatment is advantageous because of dry nature eliminating the need for additional steps of rinsing, drying, and disposal of spent liquid. Corona treatment has been carried out for many years and is effective in improving adhesion, wettability, and printability. The corona treatment, however, is not successful in improving the properties of magnetic recording media to such an extent as to fulfill the high performance which is imposed on the present day and future magnetic recording media.

Another technique known in the art is a flame treatment which is difficult to apply to magnetic recording media which require a high degree of dimensional stability.

Under these circumastances, a proposal is made to treat base films with a plasma. The plasma treatment is a one-step dry process and thus has the advantage that drying and disposal of spent solution are unnecessary and no extra material like binders is consumed. In addition, the plasma treatment enables high speed, continuous production so that it can be readily incorporated in the process of manufacturing magnetic recording media without sacrifying production speed and yield.

One technique for plasma treatment of base films is disclosed in Japanese Patent Publication No. 57-42889 (published on Sept. 11, 1982) wherein a treatment is effected with a plasma having a frequency in the range of radio frequency to microwave using a treatment gas of air, oxygen, nitrogen, hydrogen, helium, argon, etc. The radio frequency of 13.56 MHz is only described in this publication.

Also, Japanese Patent Application Kokai No. 58-77030 (laid open on May 10, 1983) descloses a process of plasma treatment by applying an AC current at the commercial frequency between electrodes using a treating gas of oxygen, argon, helium, neon or nitrogen. These plasma treatments are somewhat successful in improving the adhesion of a treated base film to a magnetic layer and hence, the durability of magnetic recording media, but not fully satisfactory in bond strength and durability.

SUMMARY OF THE INVENTION

It is, therefore, an object of the present invention to provide a magnetic recording medium comprising a plasma treated base film and a magnetic layer and exhibiting the increased bond strength of magnetic film to base film and hence, increased durability.

The inventors have found that the adhesion and other properties of base films are significantly improved by treating them with a plasma at a frequency in the range of 10 to 200 kilohertz in a treating gas selected from the group consisting of argon, neon, helium, nitrogen, and hydrogen, and mixtures thereof. Further improvements are achievable using a treating atmosphere of an oxygen-containing inorganic gas, and preferably an inorganic gas containing at least 5% by volume of oxygen, for example, argon-oxygen mixtures and air.

BRIEF DESCRIPTION OF THE DRAWINGS

The above and other objects, features, and advantages of the present invention will be more readily understood by reading the following description taken in conjunction with the accompanying drawings, in which.

DESCRIPTION OF THE PREFERRED EMBODIMENTS

The base films used in the practice of the present invention may be of any desired plastic material as long as it is non-magnetic. Generally used are polyesters such as polyethylene terephthalate. Further, the shape, size, and thickness of base films are not particularly limited as long as they meet the intended application.

According to the present invention, base films are plasma treated on at least one their surface which is to bear a magnetic layer. The plasma treatment is effected by feeding an inorganic gas as the treating gas, ionizing it, and contacting the gas-discharge plasma with the base film, thereby plasma treating the base film surface.

The principle of plasma treatment will be briefly described. When an electric field is applied to a gas kept at a reduced pressure, free electrons which are present in a minor proportion in the gas and have a remarkably greater inter-molecular distance than under atmospheric pressure are accelerated under the electric field to gain a kinetic energy (electron temperature) of 5 to 10 eV. These accelerated electrons collide against atoms and molecules to fracture their atomic and molecular orbitals to thereby dissociate them into normally unstable chemical species such as electrons, ions, neutral radicals, etc. The dissociated electrons are again accelerated under the electric field to dissociate further atoms and molecules. This chain reaction causes the gas to be instantaneously converted into highly ionized state. This is generally called a plasma. Since gaseous molecules have a less chance of collision with electrons and little absorb energy, they are kept at a temperature approximate to room temperature. Such a system in which the kinetic energy (electron temperature) of electrons and the thermal motion (gas temperature) of molecules are not correlated is designated a low temperature plasma. In this system, chemical species set up the state capable of chemical reaction such as polymerization while being kept relatively unchanged from the original. Base films are plasma treated under these conditions according to the present invention. The use of a low temperature plasma avoids any thermal influence on base films.

Figure 1:
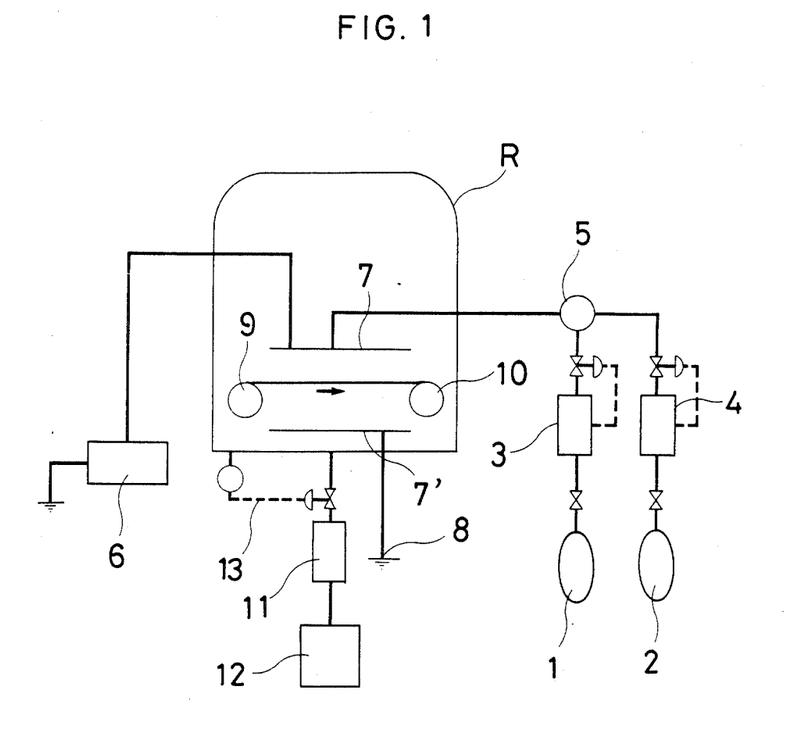
FIG. 1 is a schematic illustration of a plasma treating apparatus having a variable frequency power source.

FIG. 1 illustrates a typical apparatus in which base films on the surface thereof are treated with a plasma. This plasma apparatus uses a variable frequency power source. The apparatus comprises a reactor vessel R into which a treating gas(es) is introduced from a source 1 and/or 2 through a mass folw controller 3 and/or 4. When desired, different gases from the sources 1 and 2 may be mixed in a mixer 5 to introduce a gas mixture into the reactor vessel. The treating gases may be fed at a flow rate of 1 to 250 ml per minute.

Disposed in the reactor vessel R is means for supporting a base film to be treated, in this embodiment, a set of supply and take-up rolls 9 and 10 on which a base film for magnetic tape is wound. Depending on the particular shape of the magnetic recording medium base film to be treated, any desired supporting means may be used, for example, a rotary support apparatus on which the base film rests.

On the opposed sides of the base film to be treated are located a pair of electrodes 7 and 7', one electrode 7 being connected to a variable frequency power source 6 and the other electrode 7' being grounded at 8.

The reactor vessel R is further connected to a vacuum system for evacuating the vessel, including a liquefied nitrogen trap 11, a vacuum pump 12, and a vacuum controller 13. The vacuum system has the capacity of evacuating and keeping the reactor vessel R at a vacuum of 0.01 to 10 Torr.

In operation, the reactor vessel R is first evacuated by means of the vacuum pump 12 to a vacuum of $10^{-3}$ Torr or lower before a treating gas or gases are fed into the vessel at a given flow rate. Then the interior of the reactor vessel is maintained at a vacuum of 0.01 to 10 Torr. A take-up roll motor (not shown) is turned on to transfer the base film to be treated. When the rate of transfer of the base film and the flow rate of the treating gas mixture become constant, the variable frequency power 6 is turned on to generate a plasma with which a travelling base film is treated.

In this plasma treatment, the power source must have a frequency in the range of 10 to 200 kilohertz. Frequencies lower than 10 KHz and higher than 200 KHz result in a reduction in bond strength, and hence, durability imparted to magnetic recording media. It is to be noted that other parameters including supply current and treating time may be as usual or properly selected through experimentation.

In the preferred embodiment of the invention, an inorganic gas containing oxygen is used as the treating gas. The inorganic gas may contain an effective proportion of, preferably 5 to 100% by volume of oxygen. The inorganic gas may be oxygen alone. As the inorganic gas mention may be made of argon, neon, helium, nitrogen, hydrogen and mixtures of two or more of them. It is also contemplated to use air as the oxygen-containing inorganic gas.

In the preferred embodiment of the invention, the adhesion of magnetic layers to base film and hence, the durability of the resultant magnetic tape is substantially improved by controlling the partial pressure of oxygen in the treating atmosphere and the plasma frequency in the specific range. Particularly, the still performance and runnability of magnetic tape are improved.

On the plasma treated surface of base films a variety of magnetic layers may be formed. For example, the magnetic layers may be formed by depositing magnetic metals such as iron, cobalt and nickel or alloys thereof by vacuum deposition, ion plating, sputtering, electroplating and other metallizing techniques. The magnetic layers may also be formed by coating base films with magnetic compounds comprising magnetic powder, binders, organic solvents and other necessary ingredients followed by drying. In this case, the magnetic powder may be selected from gamma-$Fe_2O_3$, gamma-$Fe_3O_4$, cobalt-containing gamma-$Fe_2O_3$, cobalt-containing $Fe_3O_4$, Fe and the like. The binders used herein are not particularly limited. The magnetic powder, binder and other ingredients are well known in the art.

The magnetic layer may be formed on the plasma treated surface of a base film directly or via an undercort which may be formed by depositing an alloy of aluminum, copper, titanium, chromium or the like by ion plating, vacuum deposition, sputtering and other metallizing techniques. Instead, a resin optionally containing fine particles may be applied to the plasma treated surface of a base film to form an undercoat.

Examples of the present invention are presented below together with control, comparative examples and experiments. These examples are to be construed as illustrating the present invention and not limiting the present invention.

EXAMPLE 1

A polyethylene terephthalate base film of 10 μm thick was plasma treated using argon at the treating gas. The plasma treating conditions are as follows.

| | |
|---|---|
| Gas flow rate: | Argon 100 ml/minute |
| Vacuum: | 0.5 Torr |
| Frequency: | DC, AC 60 Hz - 2.45 GHz |
| Power: | 200 Watts |
| Base film transfer rate: | 30 m/minute |

On the thus treated surface of the polyester base film, a magnetic layer of 0.1 μm thick was deposited from an ingot of a 80% Co-20% Ni alloy by the oblique incidence evaporation technique, fabricating a magnetic recording tape.

EXAMPLE 2

A vacuum deposited tape was prepared by repeating the procedure of Example 1 except that the treating gas was nitrogen ($N_2$).

EXAMPLE 3

On a 10 μm thick polyester film which was plasma treated under the same conditions as in Example 1, a cobalt-nickel alloy (95% Co-5% Ni, weight basis) was sputtered to a thickness of 0.1 μm, fabricating a magnetic recording tape.

EXAMPLE 4

A sputtered magnetic recording tape was fabricated by repeating the procedure of Example 3 except that the treating gas used in the plasma treatment was nitrogen ($N_2$).

EXAMPLE 5

A base film was treated under the same conditions as in Example 1. A magnetic layer was formed on the base film by coating under the following conditions, fabricating a magnetic tape.

| Composition | Parts by weight |
|---|---|
| Fe—Co alloy powder | 100 |
| Abrasive ($Al_2O_3$) | 3 |
| Nitrocellulose | 6 |
| Epoxy resin (Epikote ® 1004) | 4 |
| Polyurethane (Nippolan ® 5033) | 10 |
| Solvent | 250 |

The composition was milled for dispersion for 5 hours in a sand mill, to which 4 parts by weight of an isocyanate (Colonate L) was added. The composition was coated by a conventional coating technique onto a 10 μm thick polyester base film which had been plasma treated in the same manner as in Example 1, while magnetic orientation was effected.

EXAMPLE 6

A magnetic tape was fabricated by repeating the procedure of Example 5 except that the treating gas used in the plasma treatment was nitrogen ($N_2$).

COMPARATIVE EXAMPLE 1

A polyester base film of 10 μm thick was treated with a corona discharge. The corona discharge treatment was carried out in a corona discharge machine P-500VA (manufactured by Pyra Co.) operating at a voltage of 200 volts while the base film was transferred at a speed of 30 m/minute. Vacuum deposited, sputtered and coated tapes were fabricated from these corona discharge-treated base films, by repeating the procedures of Examples 1, 3, and 5, respectively.

Performance tests

Samples prepared in Examples 1-6 and Comparative Example 1 were subjected to the following tests.

A. Bond strength

A adhesive tape was attached to the magnetic layer of each tape sample having a width of ¼ inch under a predetermined pressure. This adhesive tape was pulled in a direction at an angle of 180° with respect to the original surface at a given rate. The force required to peel off the adhesive tape was measured.

B. Still life

A commercially available VTR equipment was loaded with a tape and operated in a still mode to continuously reproduce a still image until the still image disappeared. Still life is a period of time during which the still image was being reproduced.

C. Contact angle

Using a contact angle meter of CA-P type (manufactured by Kyowa Chemical K.K.,Japan), the contact angle was measured by the water drop projection method.

Figure 2:
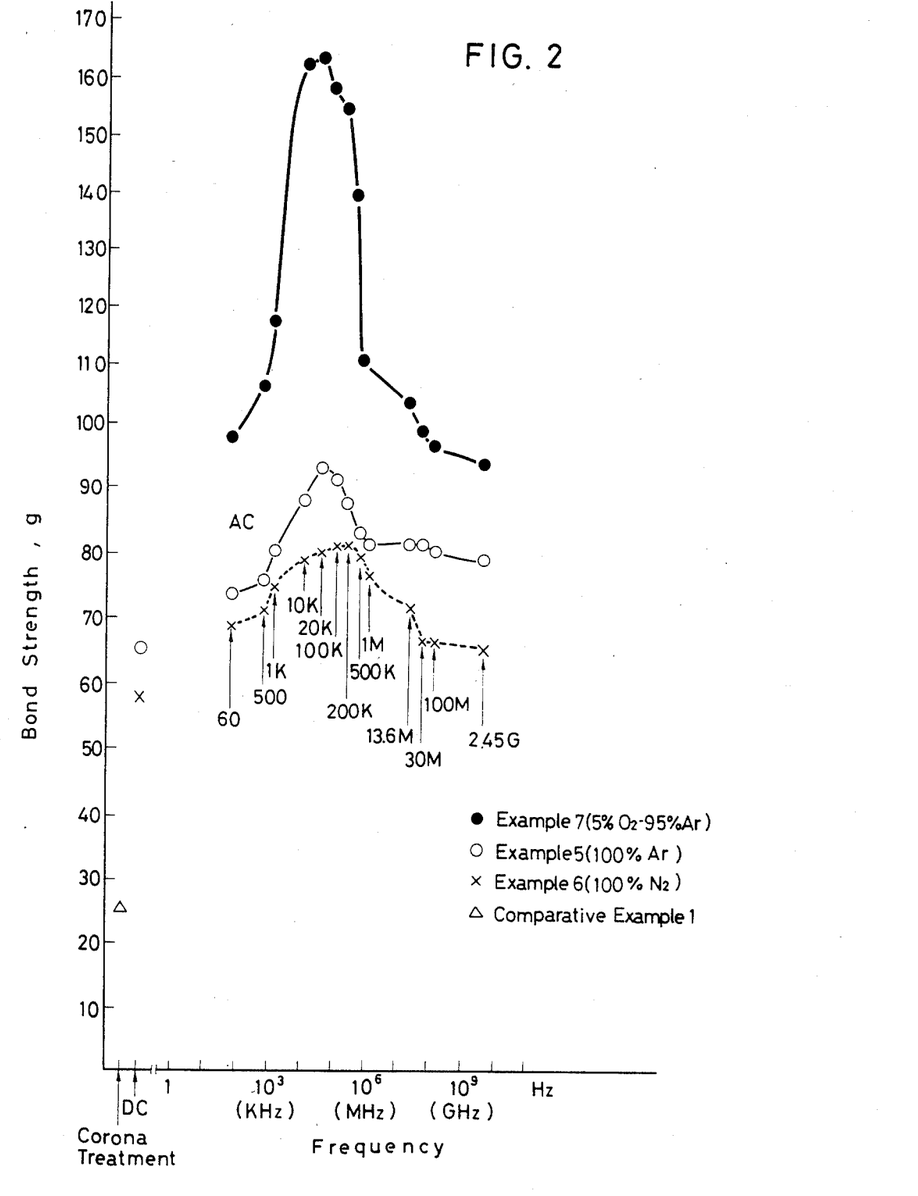
FIG. 2 is a diagram showing the bond strength of magnetic layer to base film as a function of plasma frequencies.

In the diagram of FIG. 2, the bond strength of the coated tapes of Examples 5 and 6 and Comparative Example 1 is plotted as a function of frequencies. In FIG. 2, symbol ◎ corresponds to Example 5, symbol X corresponds to Example 6, and symbol Δ corresponds to Comparative Example 1.

Figure 3:
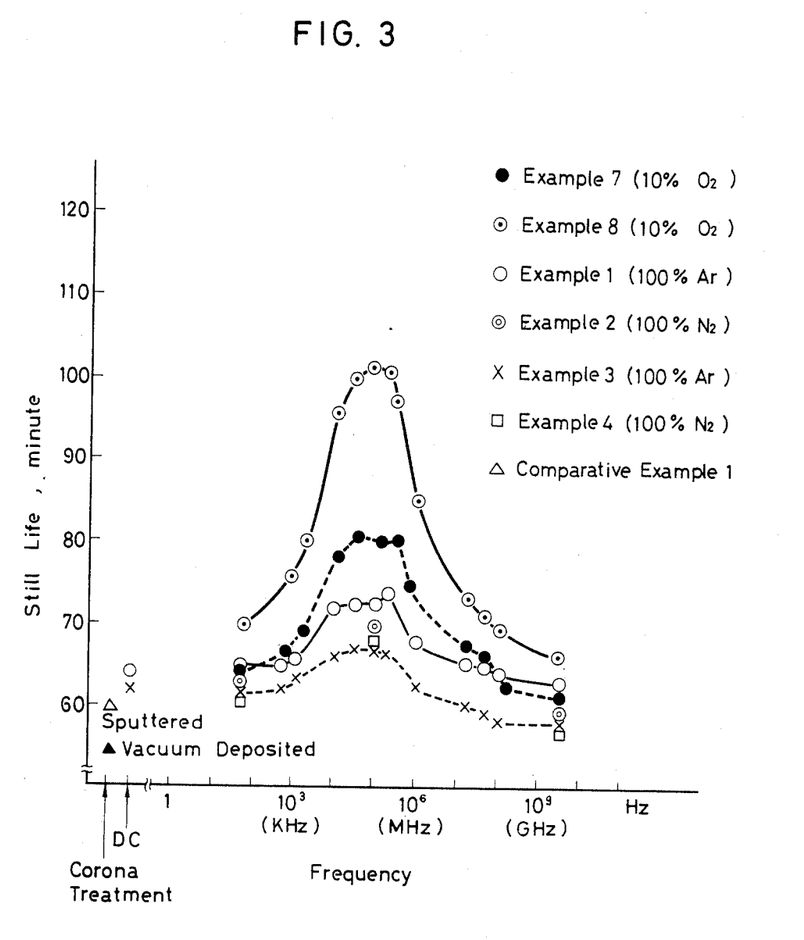
FIG. 3 is a diagram showing the still life of magnetic tapes as a function of plasma frequencies.

The still life of the sputtered tapes is plotted as a function of frequencies in the diagram of FIG. 3, in which symbols ○, ◎, X, □, and Δ corresponds to Examples 1, 2, 3, 4, and Comparative Example 1, respectively.

The data of Examples 1-6 prove that magnetic recording media having polyester base films plasma treated at frequencies between 10 kHz and 200 kHz exhibit increased bond strength and extended still life.

To investigate why such improvements were achieved, the contact angle of plasma-treated polyester films was measured. The results are shown in Table 1.

TABLE 1

| Contact Angle of Treated Film (Treating gas: Ar) | |
|---|---|
| Treatment | Contact angle (°) |
| Untreated | 71 |
| Corona treatment | 55 |
| DC plasma | 43 |
| AC plasma | 41 |
| 1 kHz plasma | 35 |
| 20 kHz plasma | 32 |
| 100 kHz plasma | 31 |
| 200 kHz plasma | 34 |
| 13.6 MHz plasma | 39 |
| 2.45 GHz plasma | 41 |

The data suggests that the surface wettability due to the reduced contact angle of film surface and the cleaned surface resulting from plasma treatment by nature cooperatively improve the bond strength and extend the still life.

The following examples illustrate plasma treatments in oxygen and oxygen-containing inorganic gas.

EXAMPLE 7

A polyethylene terephthalate base film of 10 μm thick was plasma treated using oxygen alone and mixtures of oxygen and argon as the treating gas. The plasma treating conditions were as follows.

| Gas flow rate: | 100 ml/min. fixed for both $O_2$ alone and mixtures of $O_2$ and Ar |
| --- | --- |
| Vacuum: | 0.5 Torr |
| Frequency: | DC, AC 60 Hz - 2.45 GHz |
| Power: | 200 Watts |
| Base film transfer speed: | 30 m/minute |

On the thus treated surface of the polyester base film, a magnetic layer of 0.1 μm thick was deposited in an oxygen-containing atmosphere from an ingot of an 80% Co-20% Ni alloy by the oblique incidence evaporation technique, fabricating a magnetic recording tape.

It is to be noted that the RF and microwave plasma treatments used herein correspond to 13.56 MHz and 2.45 GHz, respectively.

EXAMPLE 8

On a 10 μm thick polyester film which was plasma treated under the same conditions as in Example 7, a cobalt-nickel alloy (95% Co-5% Ni, weight basis) was sputtered to a thickness of 0.1 μm, fabricating a magnetic recording tape.

EXAMPLE 9

A base film was treated under the same conditions as in Example 7. A magnetic layer was formed on the base film by coating under the following conditions, fabricating a magnetic tape.

| Composition | Parts by weight |
| --- | --- |
| Fe—Co alloy powder | 100 |
| Abrasive ($Al_2O_3$) | 3 |
| Nitrocellulose | 6 |
| Epoxy resin (Epikote ® 1004) | 4 |
| Polyurethane (Nippolan ® 5033) | 10 |
| Solvent | 250 |

The composition was milled for dispersion for 5 hours in a sand mill, to which 4 parts by weight of an isocyanate (Colonate L) was added. The composition was coated by a conventional coating technique onto a 10 μm thick polyester base film which had been plasma treated in the same manner as in Example 1, while magnetic orientation was effected.

Samples prepared in Examples 7 to 9 were also subjected to the performance tests as defined above. The results are also plotted in FIGS. 2 and 3. In the diagram of FIG. 2, the bond strength of magnetic layer to base film is plotted as a function of frequencies. Symbols used in FIG. 2 have the following correspondence.

| Symbol | Example | Plasma | Magnetic layer |
| --- | --- | --- | --- |
| ● | Example 7 | 5% $O_2$—95% Ar | Sputtered |
| ○ | Example 5 | 100% Ar | Coated |
| X | Example 6 | 100% $N_2$ | Coated |

-continued

| Symbol | Example | Plasma | Magnetic layer |
| --- | --- | --- | --- |
| Δ | Comparative Example 1 | corona | Coated |

The still life of the tapes is plotted as a function of frequencies in the diagram of FIG. 3. The symbols used in FIG. 3 have following correspondence.

| Symbol | Example | Plasma | Magnetic layer |
| --- | --- | --- | --- |
| ● | Example 7 | 10% $O_2$—90% Ar | Vacuum deposited |
| ◉ | Example 8 | 10% $O_2$—90% Ar | Sputtered |
| ○ | Example 1 | 100% Ar | Vacuum deposited |
| ⊙ | Example 2 | 100% $N_2$ | Vacuum deposited |
| X | Example 3 | 100% Ar | Sputtered |
| □ | Example 4 | 100% $N_2$ | Sputtered |
| Δ | Comparative Example 1 | Corona | |

Figure 4:
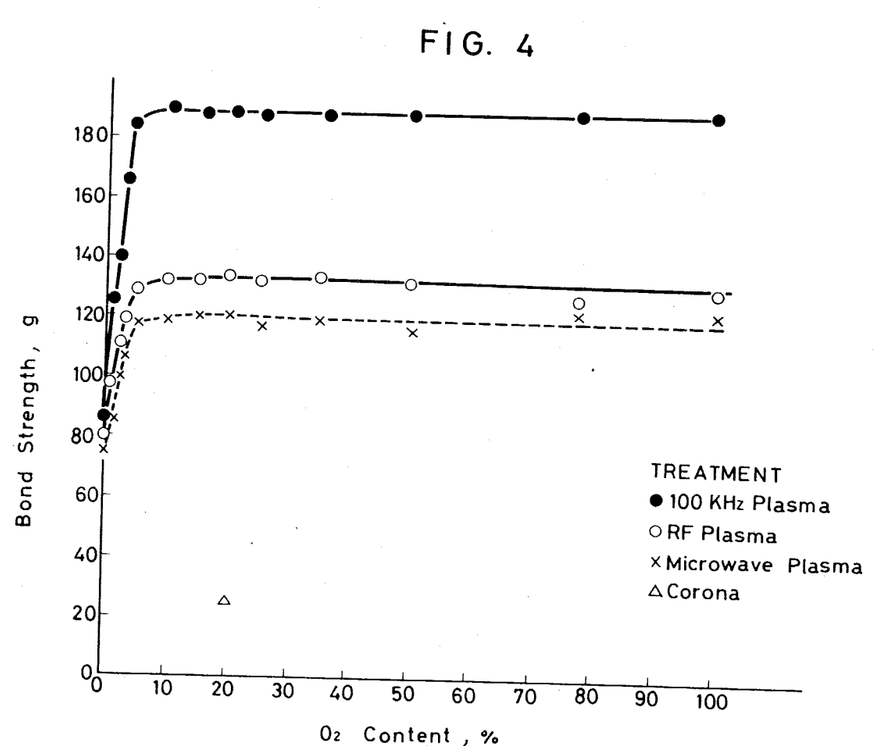
FIG. 4 is a diagram showing the bond strength of magnetic layers to base films treated according to the present invention and by the prior art technique as a function of oxygen contents in the treating gas.

The bond strength of magnetic layer to base film of the coated tapes prepared in Example 9 is plotted in the diagram of FIG. 4 as a function of oxygen contents in the atmosphere together with Comparative Example 1. The symbols used in FIG. 4 have the following correspondence.

| Symbol | Example | Treatment |
| --- | --- | --- |
| ● | Example 9 | 100 kHz plasma |
| ○ | " | RF plasma |
| X | " | Microwave plasma |
| Δ | Comparative Example 1 | Corona treatment |

Figure 5:
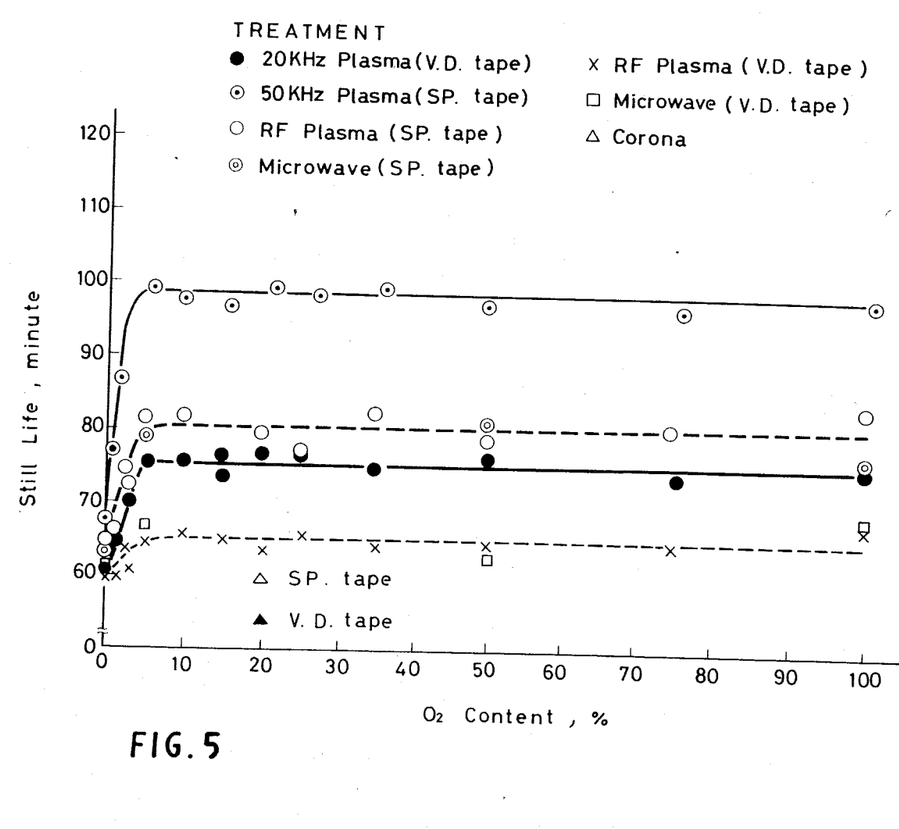
FIG. 5 is a diagram showing the still life of magnetic tapes as a function of oxygen contents in the treating gas.

The still life of the vacuum deposited and sputtered tapes prepared in Examples 7 and 8 is plotted in the diagram of FIG. 5 as a function of oxygen contents in the atmosphere. The symbols used in FIG. 5 have the following correspondence.

| Symbol | Example | Treatment | Magnetic layer |
| --- | --- | --- | --- |
| ● | Example 7 | 20 kHz plasma | Vacuum deposited |
| ○ | " | RF | " |
| ⊙ | " | Microwave | " |
| ◉ | Example 8 | 50 kHz plasma | Sputtered |
| X | " | RF | " |
| □ | " | Microwave | " |
| Δ | Comparative Example 1 | Corona | Sputtered |
| ▲ | Comparative Example 1 | Corona | Vacuum deposited |

As seen from FIGS. 4 and 5, significant improvements in bond strength and still life are observable when plasma treatment is effected at frequencies of 10 to 200 kHz in an atmosphere having an oxygen content of 5% or more.

To examine how the surface of base films was modified by plasma treatment, the contact angle of plasma-treated polyester films was measured. These measurements are plotted in FIG. 6. The symbols used in FIG. 6 have the following correspondence

Figure 6:
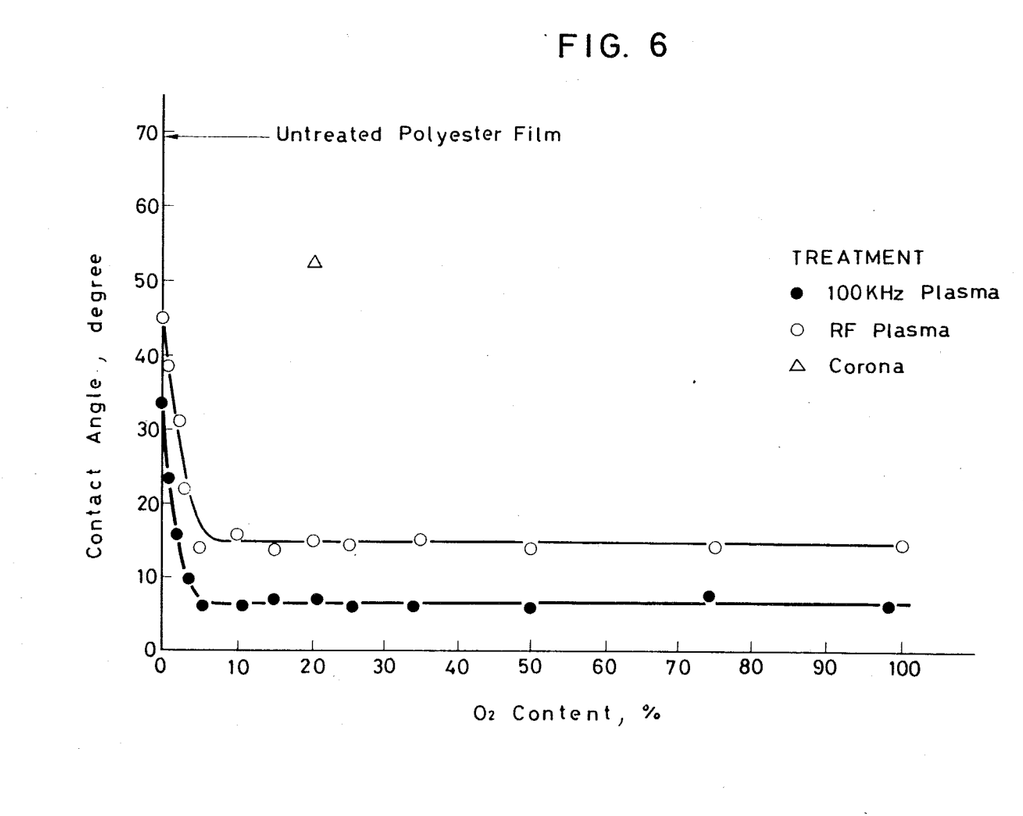
FIG. 6 is a diagram showing the contact angle of treated base films as a function of oxygen contents in the treating gas.

| Symbol | Treatment |
| --- | --- |
| ● | 100 kHz plasma |
| ○ | RF |

| Symbol | Treatment |
| --- | --- |
| Δ | Corona |

It will be understood that the data at the oxygen content of 0% in FIG. 6 corresponds to those in Table 1.

Further, the film surface was analyzed by the ESCA (electron spectroscopy for chemical analysis) to find that the peaks at 289 and 286.4 eV attributable to C=O and C—O— of the carbons of polyethylene terephthalate, respectively, are increased and the peak at 285 eV attributable to the benzene ring is decreased. This suggests that carbonyl and/or ether groups are newly created in the benzene rings of polyethylene terephthalate. This tendency is more remarkable at oxygen contents in the atmosphere of 5% or more and at frequencies of 10 to 200 kHz. It is thus believed that when the oxygen content of the atmosphere exceeds 5% by volume in the plasma treatment at frequencies of 10 to 200 kHz, functional groups are formed to a great extent such as to reduce the contact angle, providing a more wettable surface. In addition, the plasma treatment functions to clean the film surface to remove a weak boundary layer. These effects are responsible to significant improvements in bond strength and still life.

As described in the foregoing, by treating base films at their surface with a plasma at frequencies in the specified range of 10 to 200 kHz in an inorganic gas and preferably, in an oxygen-containing inorganic gas atmosphere, the present invention provides an improvement in magnetic recording media which are increasingly required to be of greater quality and durability.

What is claimed is:

1. A magnetic recording medium comprising a base film and a magnetic layer formed thereon, the base film being plasma treated at a frequency in the range of 10 to 200 kilohertz in an atmosphere consisting essentially of an inorganic gas and 5–100% oxygen by volume.

2. The magnetic recording medium according to claim 1 wherein the base film is plasma treated at a frequency in the range of 10 to 200 kilohertz in an atmosphere comprising an inorganic gas containing oxygen.

3. The magnetic recording medium according to claim 1 or 2 wherein the inorganic gas is selected from argon, neon, helium, nitrogen, hydrogen, and mixtures thereof.

4. The magnetic recording medium according to claim 1 wherein the atmosphere comprises argon and 5 to 100% by volume of oxygen.

5. The magnetic recording medium according to claim 1 wherein the atmosphere comprises nitrogen and 5 to 100% by volume of oxygen.

6. The magnetic recording medium according to claim 1 or 2 wherein the magnetic layer is formed on the base film through an undercoat layer.

7. The magnetic recording medium according to claim 1 or 2 wherein the base film is formed of a polyester.

8. The magnetic recording medium according to claim 7 wherein the base film is formed of a polyethylene terephthalate.

9. The magnetic recording medium according to claim 1 or 2 wherein the magnetic layer is a continuous thin layer.

10. The magnetic recording medium according to claim 9 wherein the magnetic layer is formed from a magnetic metal selected from the group consisting of iron, cobalt and nickel, and mixtures thereof, by a technique selected from the group consisting of vacuum deposition, ion plating, sputtering, and electroplating.

11. The magnetic recording medium according to claim 1 or 2 wherein the magnetic layer is formed from a composition comprising a magnetic metal powder and a binder by coating.

* * * * *